Figure 1:
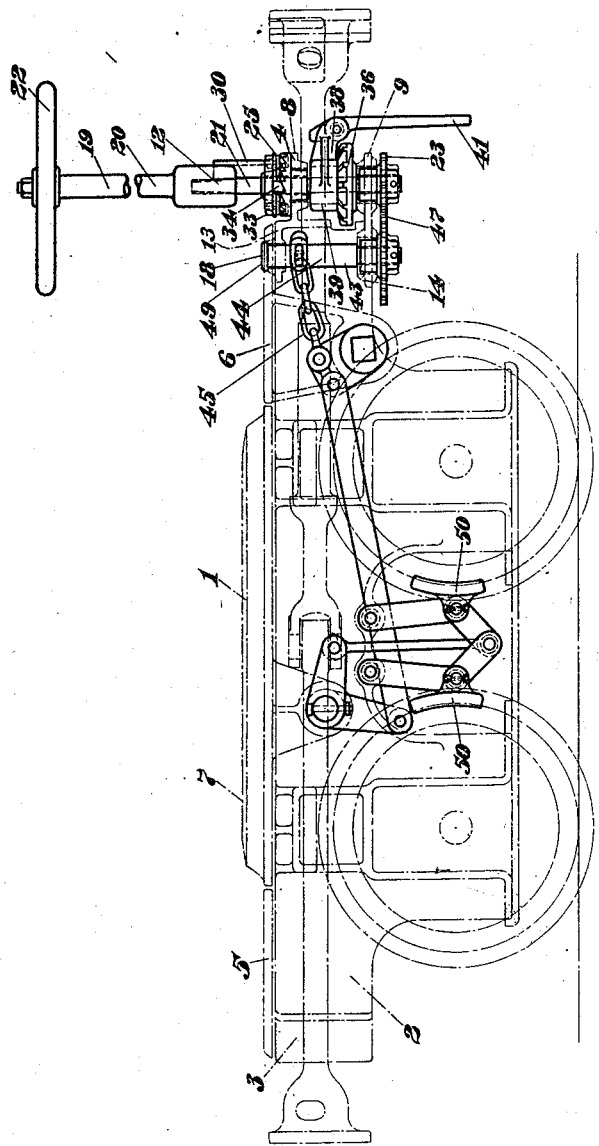

B. D. LOCKWOOD
BRAKE MAST.
APPLICATION FILED FEB. 12, 1918.

1,286,678.

Patented Dec. 3, 1918.
2 SHEETS—SHEET 1.

Witnesses
H. W. Bender
Frank E. Miller

Inventor
Burns D. Lockwood,
By G. C. Laube.
Attorney

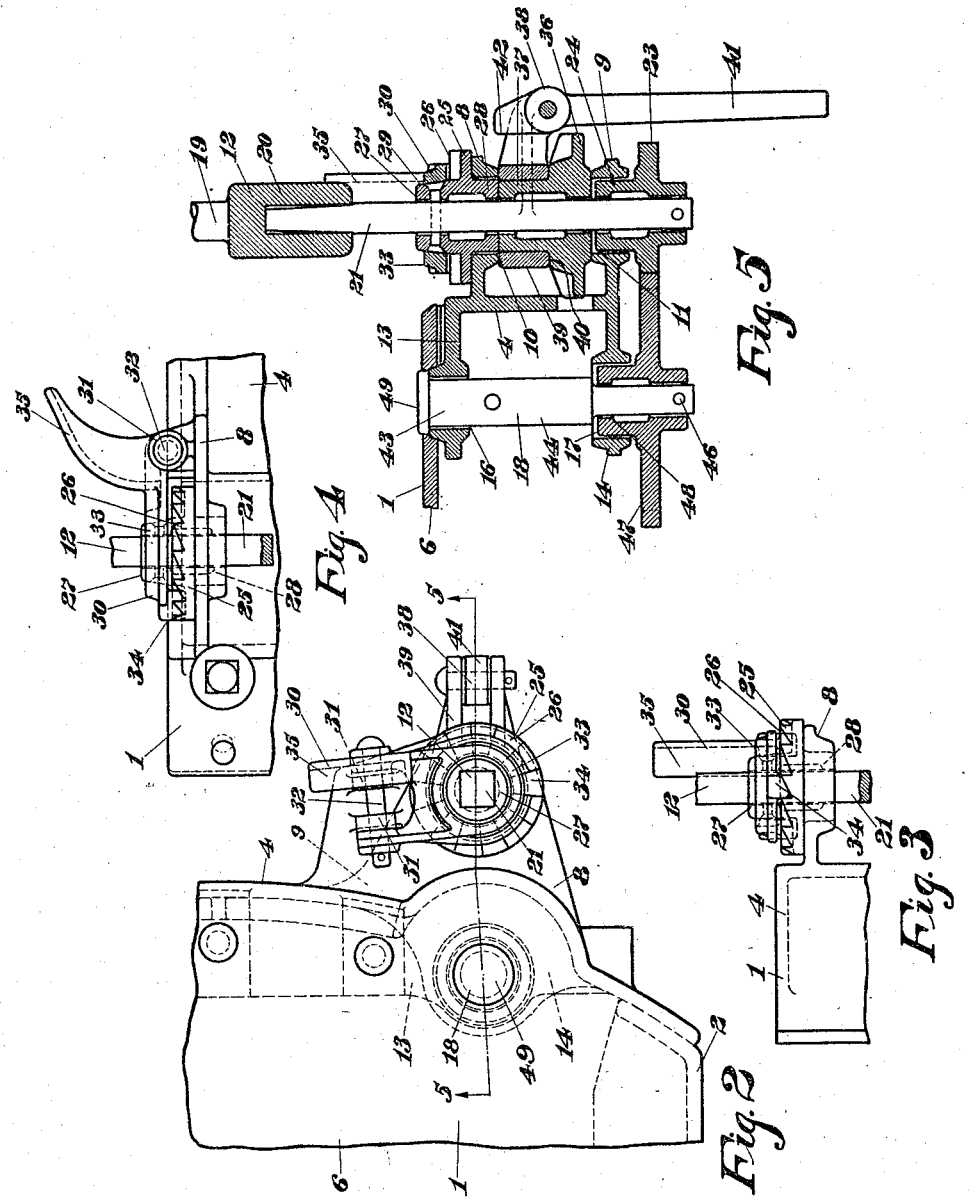

UNITED STATES PATENT OFFICE.

BURNS D. LOCKWOOD, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

BRAKE-MAST.

1,286,678.  Specification of Letters Patent.  Patented Dec. 3, 1918.

Application filed February 12, 1918. Serial No. 216,822.

*To all whom it may concern:*

Be it known that I, BURNS D. LOCKWOOD, a citizen of the United States, residing in Bellevue, in the county of Allegheny and State of Pennsylvania, have invented certain new and useful Improvements in Brake-Masts, of which the following is a specification.

This invention relates to improvements in brake masts for trucks of a type which are being used in military operations and has as an object the simplification, and the reduction to a minimum of the number, of parts forming the brake mast.

Another object of the invention is to provide a brake mast which may be manually operated from the railroad track and from the floor of the truck to which it is applied.

A further object of the invention is to provide a brake mast having a removable upper section and a fixed lower section each of said sections having independent means whereby the mast may be operated.

A still further object of the invention is to provide a novel gravity pawl for holding the brake mast against accidental reverse rotation.

These and other objects will be apparent from the following description:

Referring to the drawings in which like reference characters refer to like parts, Figure 1 is a side elevational view of a truck showing the brake mast applied thereto; Fig. 2 is an enlarged plan view of the brake mast and a portion of the truck; Fig. 3 is a side elevational view of the same; Fig. 4 is an enlarged end elevational view of the same, and Fig. 5 is a sectional view taken on the line 5—5 of Fig. 2.

Referring now in detail to the drawings, 1 indicates the truck which preferably comprises side frames 2 which are connected together at their ends by end sills 3 and 4. The floor or top of the truck may comprise plates 5 and 6 which may be suitably secured to the side frames and to the end sills 3 and 4 respectively and may also comprise a plate 7 which may be secured to the side frames.

The end sill 4 is preferably of cast metal and is provided with brackets 8 and 9 which project outwardly beyond the front face of the sill, which brackets have openings 10 and 11 respectively formed therein for the reception of a brake mast 12. This end sill is also provided with brackets 13 and 14 which project inwardly from the back of the sill and have openings 16 and 17 respectively formed therein for the reception of a chain winder 18.

The brake mast 12 comprises a shaft 19 which preferably comprises upper and lower operatively connected sections 20 and 21 respectively, the upper section 20 being provided with a hand wheel 22 by means of which the brake mast may be rotated. The lower section 21 is preferably square in cross section for its full length and at its lower end is provided with a gear wheel 23 which is secured thereto by a cotter pin or any other suitable means. This gear wheel is provided with a portion 24 which, when the mast is in its proper position, extends into the opening 11 formed in the bracket 9 and forms a journal for the lower end portion of the section 21. The section 21 is also provided with a ratchet wheel 25 which is secured thereto by a rivet or other suitable means. This ratchet tion 27 extends above the toothed portion 26 and upper and lower annular portions 27 and 28 respectively. When the brake mast is in its proper position the lower portion 28 of the ratchet wheel extends into the opening 10 formed in the bracket 8 and forms another journal for the section 21. The portion 27 extends above the toothed portion 26 and has its outer surface 29 beveled upwardly, *i. e.*, has its diameter gradually decreased toward its top.

To lock the brake mast against accidental reverse rotation a pawl 30 is provided which is pivotally connected with the bracket 8 through medium of lugs 31 which are preferably integral with the bracket, and a pin 32 which passes through the pawl and the lugs 31. This pawl is provided with a horizontal portion 33 which preferably surrounds the upper portion 27 of the ratchet wheel and is provided with a tooth 34 which is adapted to engage the teeth of the ratchet wheel. The pawl is also provided with an upwardly extending portion 35 by the means of which an operator may operate the pawl to raise the tooth 34 out of engagement with the teeth of the ratchet wheel. When the pawl is operated the horizontal portion 33 will move radially on the pin 32 and the upper portion 27 of the ratchet wheel being beveled will permit such movement without any binding action therebetween, thus insuring the free operation of the pawl and the brake mast. The horizontal portion 33 of the pawl is of greater weight than the portion 35 and will by gravity thus automatically keep the tooth 34 in engagement with the teeth of the ratchet wheel until such time as the pawl is operated by the operator to release the brakes.

Intermediate the brackets 8 and 9 of the end sill, the section 21 of the shaft 19 is provided with a toothed wheel 36 which is provided with a sleeve portion 37 upon which a hand lever 38 is mounted. This hand lever comprises a yoke 39 which is rotatably mounted on the sleeve portion 37 of the toothed wheel and is held against vertical movement by its engagement with the bracket 8 of the end sill and with a shoulder 40 formed on the toothed wheel 36, which toothed wheel 36 is held against vertical movement by its engagement with the bracket 9 of the end sill at one end and with the lower portion of the ratchet wheel 25. This lever also comprises a hand portion 41 which is pivotally connected with the yoke 39 and at its inner end is provided with a tooth 42, which when the lever is in a horizontal or operable position is adapted to engage the teeth of the wheel 36 and which when the lever is in inoperative position as shown in the drawings, will be out of engagement with the teeth of the wheel 36.

The chain winder 18 comprises a vertically disposed member 43 which is provided with a portion 44 upon which the brake chain 45 is adapted to be wound and is also provided with a portion 46 which is preferably square in cross section. To this portion 46 of the winder, a gear wheel 47 is secured, which gear wheel has a portion 48 which extends upwardly within the opening 17 formed in the bracket 14 and forms a journal for the lower portion of the winder. The teeth of the gear wheel 47 mesh with the teeth of the gear wheel 23 on the section 21 of the brake shaft, so that any rotation of the brake mast will be transmitted to the winder. It will here be noted that these gear wheels are so proportioned that they form a power increasing device. The winder is provided with an enlarged head portion 49 which engages the bracket 13 of the end sill and thus prevents vertical movement of the winder in one direction, movement of the winder in the opposite direction being prevented by the engagement of the gear wheel 47 with the underside of the bracket 14.

50 indicates the brake shoes which are operable from the brake mast through the medium of any suitable mechanism, the mechanism shown in the drawings being substantially the same as that described and claimed in my pending application for United States Letters Patent, filed October 4, 1917, for truck and serially numbered 194,695.

Having thus described the invention, what I claim as new and desire to secure by Letters Patent is:

1. The combination with a truck, of a brake mask mounted on said truck, said mast comprising a plurality of connected rotatable sections, one of said sections being fixed to said truck and the other being removable from the first mentioned section, and each of said sections having means independent of the other for rotating said mast.

2. The combination with a truck, of a brake mast mounted on said truck, said mast comprising a rotatable shaft having a fixed lower section and a removable upper section and each one of said sections having means independent of the other for rotating said mast.

3. The combination with a truck of an end sill forming part of said truck, brackets projecting from said sill, and a brake mast rotatably mounted in said brackets, said brake mast comprising a shaft substantially square in cross section for a portion of its length, a ratchet wheel secured to the square portion of said shaft, said ratchet wheel having an annular portion adapted to extend into one of said brackets to form a journal for the brake mast, and a gear wheel secured to the square portion of said shaft, said gear wheel having an annular portion adapted to extend into the other of said brackets to form another journal for said mast.

4. The combination with a truck, of an end sill forming part of said truck, brackets projecting from said sill, a brake mast comprising upper and lower sections, the lower section being journaled in said brackets and the upper section being removable from said lower section, and a lever mounted on said lower section for rotating said mast.

5. The combination with a truck, of an end sill forming part of said truck, brackets projecting from said sill, a brake mast comprising upper and lower sections, the lower section being journaled in said brackets and the upper section being removable from said lower section, and a lever mounted on said lower section for rotating said mast, said lever comprising a toothed wheel mounted on said lower section and rotatable therewith, a yoke rotatably mounted on said wheel, and a member pivotally connected with said yoke and adapted to be raised or lowered into or out of engagement with said toothed wheel.

In testimony whereof I affix my signature in the presence of two witnesses.

BURNS D. LOCKWOOD.

Witnesses:
FRANK E. MILLER,
A. C. FIELDS, Jr.

Copies of this patent may be obtained for five cents each, by addressing the "Commissioner of Patents, Washington, D. C."

Correction in Letters Patent No. 1,286,678.

It is hereby certified that in Letters Patent No. 1,286,678, granted December 3, 1918, upon the application of Burns D. Lockwood, of Bellevue, Pennsylvania, for an improvement in "Brake-Masts," an error appears in the printed specification requiring correction as follows: Page 1, line 78, strike out the syllable and words "tion 27 extends above the" and insert the words *wheel is provided with a;* and that the said Letters Patent should be read with this correction therein that the same may conform to the record of the case in the Patent Office.

Signed and sealed this 23d day of December, A. D., 1919.

[SEAL.]

M. H. COULSTON,
*Acting Commissioner of Patents.*

Cl. 188—56.